United States Patent [19]
Colman

[11] Patent Number: 5,120,445
[45] Date of Patent: Jun. 9, 1992

[54] MIXING APPARATUS AND METHOD

[75] Inventor: Derek A. Colman, Fleet, England

[73] Assignee: The British Petroleum Co. p.l.c., London, England

[21] Appl. No.: 373,432

[22] Filed: Jun. 30, 1989

[30] Foreign Application Priority Data

Jul. 26, 1988 [GB] United Kingdom ........... 8817793

[51] Int. Cl.$^5$ ............................................. B01D 61/36
[52] U.S. Cl. ................................. 210/640; 210/456; 210/321.87
[58] Field of Search ............... 210/321.72, 321.68, 210/321.89, 456, 640, 321.87; 55/16, 158

[56] References Cited

U.S. PATENT DOCUMENTS

| | | | |
|---|---|---|---|
| 2,985,588 | 5/1961 | Binning et al. | 210/640 |
| 3,647,187 | 3/1972 | Dannewitz et al. | 366/339 |
| 3,648,754 | 3/1972 | Sephton | 210/321.89 X |
| 3,934,982 | 1/1976 | Arp | 55/158 X |
| 3,949,970 | 4/1976 | Gerardurter et al. | 366/79 |
| 4,049,241 | 9/1977 | Taniguchi | 366/339 |
| 4,075,091 | 2/1978 | Bellhouse | 210/637 |
| 4,179,222 | 12/1979 | Stom et al. | 366/337 |
| 4,220,416 | 9/1980 | Brauner et al. | 366/337 |
| 4,663,050 | 5/1987 | Li et al. | 210/640 X |

FOREIGN PATENT DOCUMENTS

| | | |
|---|---|---|
| 0079040 | 5/1983 | European Pat. Off. |
| 2258348 | 11/1972 | Fed. Rep. of Germany |
| 2525229 | 6/1975 | Fed. Rep. of Germany |
| 2448000 | 7/1975 | Fed. Rep. of Germany |
| 1380303 | 1/1975 | United Kingdom |
| 1386955 | 3/1975 | United Kingdom |
| 1389508 | 4/1975 | United Kingdom |
| 1442754 | 7/1976 | United Kingdom |
| 1458878 | 12/1976 | United Kingdom |
| 2045913B | 11/1980 | United Kingdom |
| 2050183B | 1/1981 | United Kingdom |
| 2057282B | 1/1981 | United Kingdom |
| 2168907A | 7/1986 | United Kingdom |
| 2168907 | 7/1986 | United Kingdom |
| 2188563A | 10/1987 | United Kingdom |

OTHER PUBLICATIONS

Rosenblatt, Defensive Publication, T912,007, Jul. 1973.
WO82/02004, Jun. 1982.
WO87/00079, Jan. 1987.
Mackley, "Using Oscillatory Flow To Improve Performance", from Chem. Eng., Feb. 1987, pp. 18–20.
Dorrington, et al., "Oxygen and $CO_2$ Transfer of a propylene ...", from J. Biomed Eng. 1985, Apr., vol. 7, pp. 89–99.

Primary Examiner—Frank Spear
Attorney, Agent, or Firm—Larry W. Evans; Joseph G. Curatolo; Sue E. Phillips

[57] ABSTRACT

An apparatus and method for effecting mass or heat transfer between the bulk of a fluid and a transfer surface boundary layer comprises a conduit having transverse baffles spaced apart from the transfer surface such that vortex mixing is induced in fluid passed along the conduit in pulsed flow. The transfer surface may be a membrane suitable for microfiltration, ultrafiltration or pervaporation.

22 Claims, 10 Drawing Sheets

RECTANGULAR   TRIANGULAR   CIRCULAR   DIAMOND
FIG.7

FIG. 9 Pulsatile flow.

Key:
- + unbaffled conduit with oscillatory flow
- × baffles at 6mm spacing with pulsed flow (ball valve)
- □ baffles at 6mm spacing with oscillatory flow (5mm stroke)
- △ baffles at 6mm spacing with oscillatory flow (14mm stroke)
- ▽ baffles at 12mm spacing with oscillatory flow (5mm stroke)
- ○ baffles at 12mm spacing with oscillatory flow (14mm stroke)

FIG.10 Furrowed conduit with oscillatory flow.

Key:
+ 14mm stroke
× 5mm stroke

MIXING APPARATUS AND METHOD

MIXING APPARATUS AND METHOD

The present invention relates to mixing apparatus and in particular to an apparatus and method for effecting mass or heat transfer between the bulk of a fluid and a surface boundary layer of the fluid.

Polarisation due to poor mass or heat transfer between the bulk of a fluid and a surface boundary layer may adversely affect a variety of processes such as filtration, ultra-filtration, microfiltration, reverse osmosis, electrodialysis, electrodeposition, electrolysis, heterogenous catalysis, dissolution, heat exchange and the like. Such processes take place at a transfer surface. A transfer surface is a surface at which mass or heat transfer may take place and may comprise a membrane, filter, electrode, catalyst surface, heat exchange surface and the like.

Such processes may be effected in a conduit wherein the fluid is passed along the conduit and over the transfer surface such that mass or heat transfer takes place between the bulk of the fluid and a surface boundary layer of the fluid and thence between the boundary layer and the transfer surface.

It is usually desirable to have good mass or heat transfer perpendicular to the transfer surface to reduce polarisation without excessive mixing in the direction of the fluid flow which can reduce a concentration or temperature gradient in the direction of the fluid flow. Furthermore, good mass transfer may help to reduce fouling in ultrafiltration processes for example.

One way of inducing this perpendicular mixing is to create turbulent flow in the fluid using a high fluid flow rate over the transfer surface. This has the disadvantage that the nett transfer between the surface and the fluid per unit length of surface is low and fluid may have to be recycled. There are other ways of inducing mixing, for example, European patent application no. EP 0079040 relates to a filtration method in which the liquid flow is pulsed to reduce surface fouling. United Kingdom patent application no. GB2188563A relates to a membrane layer having protrusions (e.g. studs and/or ribs) serving as flow disturbing means. United Kingdom patent application no. GB 2168907 relates to a membrane filtration method in which the fluid flow is pulsed and further in which the transfer surface is adapted to produce vortex mixing by machining grooves or furrows into it.

It is not always possible to fabricate thin or fragile membranes with grooves or furrows on their surface. Also, if the membrane is of the coated type, it may not be possible to apply it to an undulating surface since, when the membrane is cast as a liquid it may settle into the grooves before setting. Also, if baffles are applied to a transfer surface the effective area of the transfer surface may be reduced or become damaged by the baffles.

Thus, according to the present invention there is provided apparatus for effecting mass or heat transfer between the bulk of a fluid and a surface boundary layer of the fluid at a transfer surface, the apparatus comprising a conduit having a transfer surface, means for passing the fluid in pulsatile flow along the conduit and over the transfer surface and one or more baffles transverse to the direction of the fluid flow, the baffles being adapted to induce vortex mixing and being spaced apart from the transfer surface.

According to the present invention there is also provided a method of effecting mass or heat transfer between the bulk of a fluid and a surface boundary layer of the fluid at a transfer surface, comprising passing the fluid in pulsatile flow along a conduit and over a transfer surface, the conduit having baffles transverse to the direction of the fluid flow and the baffles being spaced apart from the transfer surface so that vortex mixing is induced in the fluid.

The transfer surface may comprise a filter, membrane, electrode, catalyst, heat exchanger or the like. The apparatus and method may be used for membrane filtration such as ultrafiltration, microfiltration or reverse osmosis wherein the fluid comprises liquid with suspended particulate material, colloidal material or solute and the transfer surface comprises a membrane having pores of a suitable size to allow at least a part of the liquid to pass through the membrane and to be collected on the other side of the membrane whilst the particulate material, colloidal material or solute is retained within the conduit. Similarly, the apparatus may be used for filtration of solid/gas fluid or liquid/gas fluid.

The apparatus and method of the present invention may be used for pervaporation wherein a fluid comprising at least two liquids is passed in pulsatile flow along the conduit and over the transfer surface, the transfer surface comprising a membrane selectively permeable to at least a part of one of the liquids which passes through to the other side of the membrane over which a gas or liquid is passed or to which a reduced pressure is applied.

The apparatus and method of the present invention may be used for such processes as osmosis, reverse osmosis, electrodeposition, electrolysis, dissolution, electrodialysis, heterogenous reactions, heterogenous catalysis, and the like.

The apparatus and method of the present invention may be used for heat transfer between two fluids; one fluid inside the conduit and the other fluid outside the conduit in contact with the transfer surface. In this embodiment the transfer surface should have good heat transfer characteristics but may not allow mass transfer.

The conduit may have any suitable transverse cross-section. The cross-section may be circular, square or rectangular.

The transfer surface may form all or part of the conduit. For example, the conduit may have a square or rectangular transverse cross-section with the transfer surface forming one or two sides of the conduit.

Preferably, the baffles have sharp edges, for example with thin rectangular, triangular or diamond lateral cross-section. The baffles may have a circular, square or rectangular transverse cross-section. Preferably, the transverse cross-section area of the baffles is 40 to 60% of the transverse cross-section area of the conduit. The baffles may be spaced at intervals along the conduit. The baffles may be mounted at intervals on a shaft along the conduit. The baffles may be attached to the parts of the conduit which do not comprise the transfer surface. Preferably, for square or rectangular transverse cross-section conduits having a pair of transfer surfaces forming opposite sides of the conduit, the baffle spacing is 1 to 4 times the distance between the opposite transfer surfaces. Preferably, for circular transverse cross-section conduits with circular transverse cross-section baffles, the baffle spacing is 1 to 4 times the transverse diameter of the conduit. The baffles may be hollow and heat exchange fluid may be passed through the baffles, for example in pervaporation wherein latent heat of vaporisation may cool the fluid.

The pulsatile fluid flow may be pulsed unidirectionally, that is to say the velocity of the fluid in the general direction of the fluid flow may vary periodically between a known maximum and a known minimum. Preferably, the pulsatile fluid flow is oscillatory so that fluid flow reversal takes place; that is to say the velocity of the fluid in the general direction of the fluid flow rises and falls in a continuous manner and passes through a negative value whilst still retaining an average flow greater than or equal to zero along the conduit. The oscillatory fluid flow may be sinusoidal but other oscillatory flow forms may be used.

The pulsatile flow may be provided by continuously pumping the fluid along the conduit, for example by a centrifugal or gear pump and superimposing unidirectional pulses or reciprocating oscillations by use of suitable pumps, valves or other mechanisms. The pulsatile flow may be provided by a double piston pump.

The invention will now be described by way of example only and with reference to the accompanying drawings.

To show the effect of vortex mixing on the mass transfer at the surface of a membrane in a conduit the technique of measuring electrochemical limiting current was used. In this method the current flow to an electrode under limiting current conditions is proportional to the mass transfer. The reaction used in the method for the examples contained herein was the reduction of ferricyanide ion in potassium ferricyanide to ferrocyanide at the cathode An electrolyte was prepared in distilled water as 0.005 molar potassium ferricyanide, 0.015 molar potassium ferrocyanide and 0.5 molar potassium hydroxide.

Figure 1:
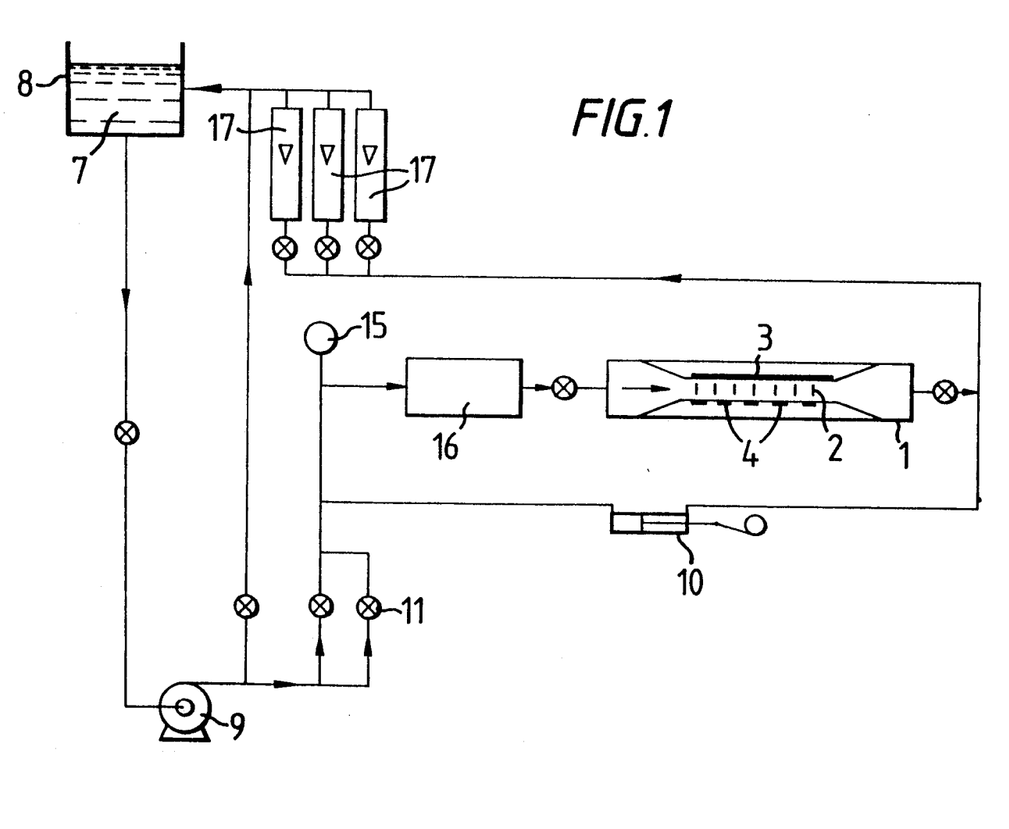
FIG. 1 represents, in schematic form, the apparatus used for measuring the effect of baffles and fluid flow on the mass transfer coefficient.
Figure 2:
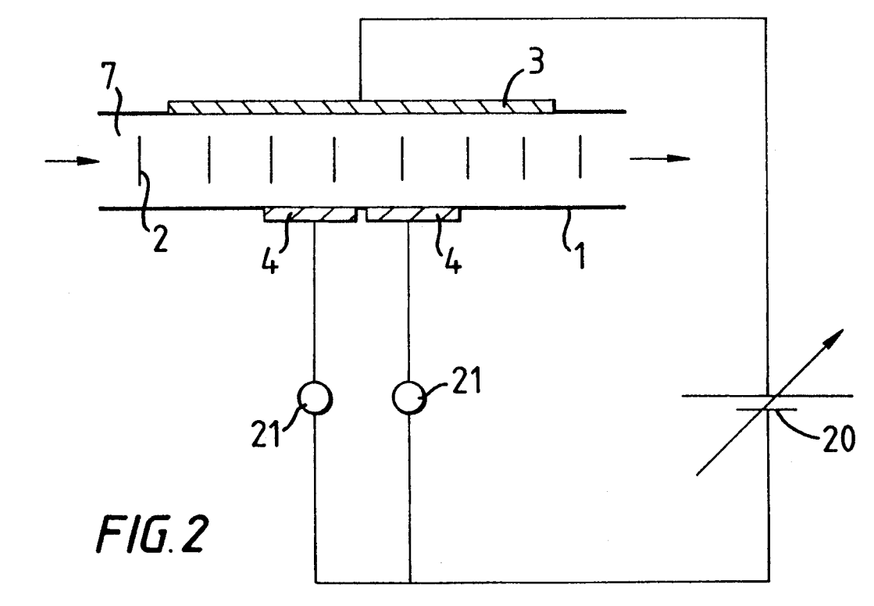
FIG. 2 represents, in schematic form, the circuit diagram for the apparatus of FIG. 1.
Figure 3A:
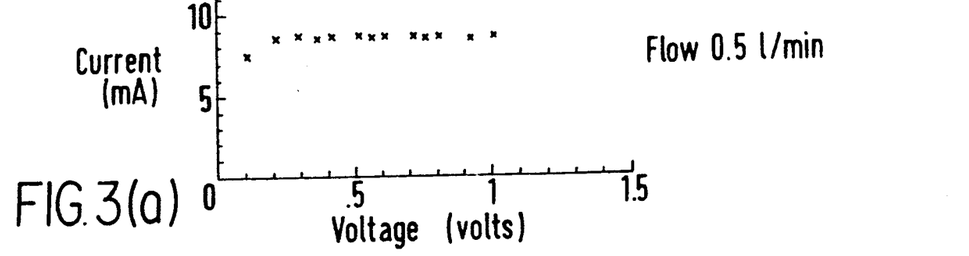
FIG. 3 shows, in graph form, limiting current curves for steady fluid flow through an unbaffled conduit.
Figure 3B:
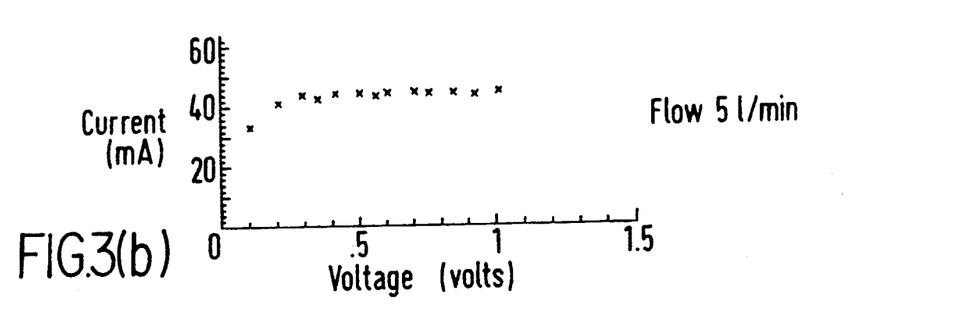
Figure 3C:
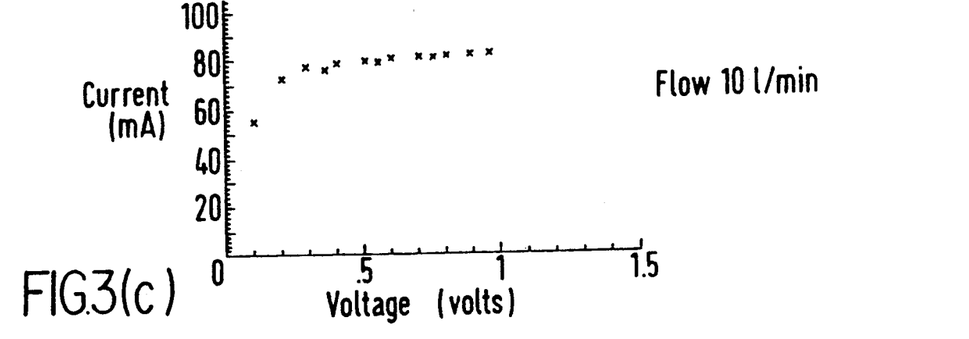
Figure 3D:
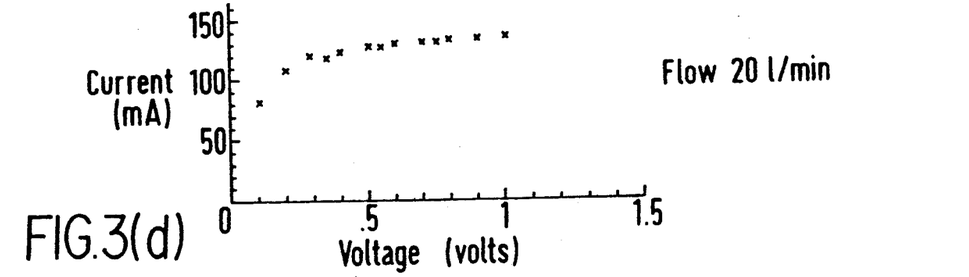

The apparatus used for the present experiments is shown in FIGS. 1 and 2.

In FIGS. 1 and 2, a conduit (1) was provided with baffles (2). The conduit had a rectangular transverse cross-section 6 mm high with two opposed sides being defined by a nickel anode (3) and nickel cathodes (4) as transfer surfaces 6 mm apart. Two conduits of different widths were used; 23.6 mm and 30 mm wide. Fluid (7) could be pumped from a header tank (8) by a centrifugal pump (9) through the conduit (1) at constant velocity. A double piston pump (10) and a rotating ball valve (11) could be used to superimpose oscillations or pulses onto the fluid flow through the conduit (1). The pressure of the fluid was measured by a pressure gauge (15) and the flow was measured by an electromagnetic flow meter (16) and rotameters (17). A variable voltage supply (20) provided voltage to the electrodes (3,4) and the current was measured by zero resistance ammeters (21).

The conduit (1) was used with and without baffles, the baffles had a rectangular lateral cross-section. Comparative experiments were performed with furrowed sides to the conduit and with baffles on the electrode sides of the conduit.

FIG. 3 shows the limiting current curves for different rates of steady fluid flow through the conduit without baffles.

Figure 4:
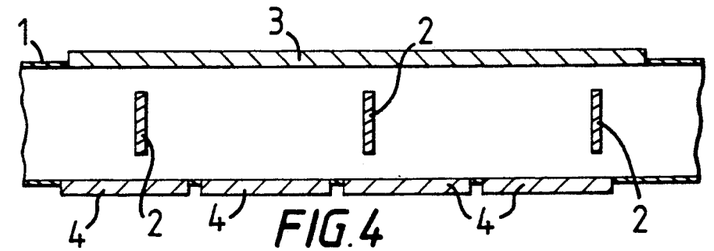
FIG. 4 shows, in longitudinal cross-section, a conduit with one type of baffle according to the present invention.
Figure 5:
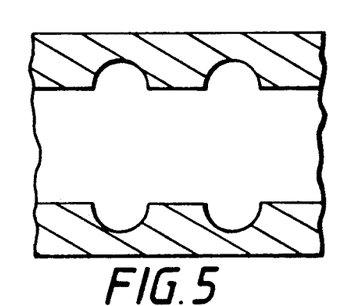
FIG. 5 shows, in longitudinal cross-section, a furrowed conduit.
Figure 6:
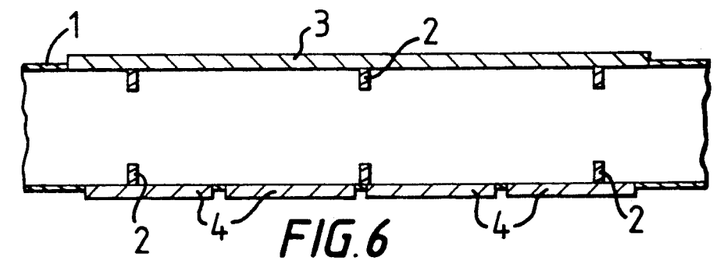
FIG. 6 shows, in longitudinal cross-section, a conduit with baffles on the transfer surfaces of the conduit.
Figure 7:
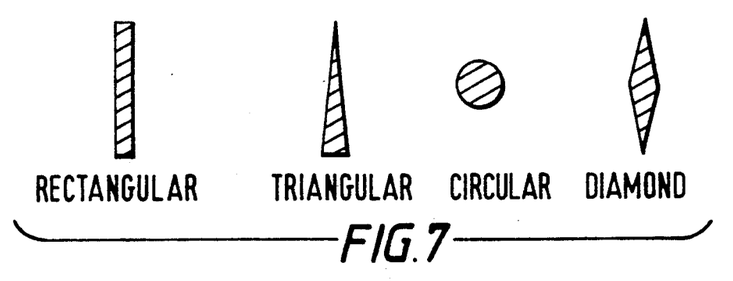
FIG. 7 shows lateral cross-sections of various types of baffles which may be used in the present invention.

FIGS. 4 to 6 show the different types of baffles used. In FIG. 4 the longitudinal cross-section of the conduit (1) is shown with baffles (2) which had rectangular lateral cross-section and extended transversely across the conduit. The baffles were 3 mm high and 1 mm thick. The conduit was 6 mm high so that 1.5 mm gaps were left between the baffles (2) and the electrodes (3,4) defining opposite sides of the conduit. Baffle spacings of 6 mm and 12 mm were used. The baffles were attached to the sides of the conduit which did not form the electrodes. In FIG. 5 the longitudinal cross-section of the conduit is shown with furrowed sides, the furrows being semi-circular in cross-section and extending transversely across the conduit on the two opposed electrode sides of the conduit. The furrows were 1.5 mm deep and the conduit was 6 mm high. In FIG. 6 baffles are shown on the electrode sides of the conduit. The baffles were 1.5 mm high and 1 mm thick and in pairs so that each pair had the same transverse cross-section area as a central baffle of the type shown in FIG. 4. The conduit was 6 mm high so that the edges of the baffles were 3 mm apart. FIG. 7 shows in lateral cross-section some types of baffles which may be used according to the present invention, having rectangular, triangular, circular and diamond lateral cross-sections.

In use, the solution (7) of potassium ferricyanide, potassium ferrocyanide and potassium hydroxide was pumped through the conduit (1) at different speeds with different configurations of baffles, and with different frequencies and amplitudes of pulses and oscillations. The peak to peak fluid displacement is defined herein as the peak to peak volume displacement divided by the transverse cross-section area of the conduit. The peak to peak volume displacement is the absolute volume displacement, being twice the forward or backward volume displacement for each pump stroke.

The fluid properties of the solution (7) were essentially those of 0.5 molar potassium hydroxide in laboratory distilled water. In order to maintain a stable operating temperature (40° C.±1° C.) the apparatus was operated continuously during the experiments.

COMPARATIVE EXPERIMENTS

The mass transfer coefficients for steady flow in the 23.6 mm wide conduit without baffles were measured and found to be in good agreement with published data. The results are shown in FIG. 8.

Figure 8:
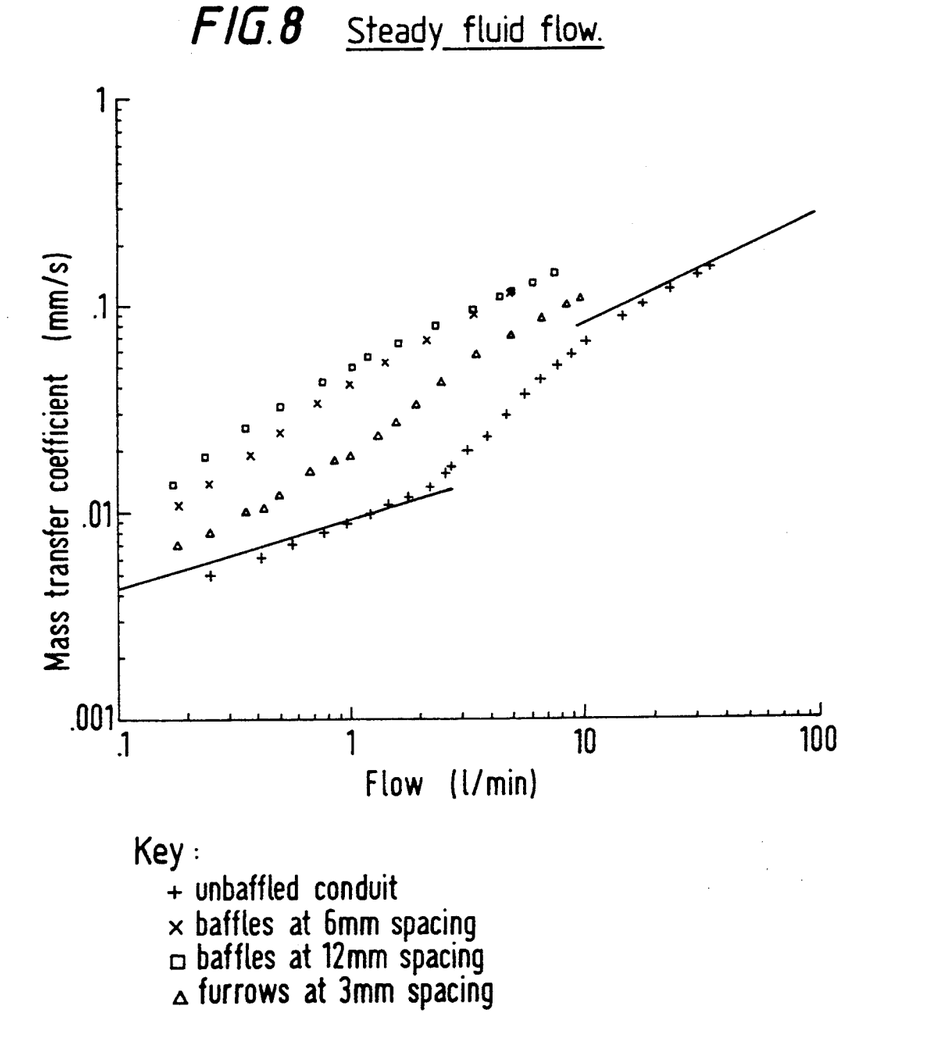
FIG. 8, shows in graph form, mass transfer coefficients which were measured in a baffled and unbaffled conduit with steady fluid flow.

The mass transfer coefficients for steady flow with baffles as in FIG. 4 and with a furrowed conduit as in FIG. 5 were also measured for the 23.6 mm wide conduit and the results are also shown in FIG. 8.

Figure 9:
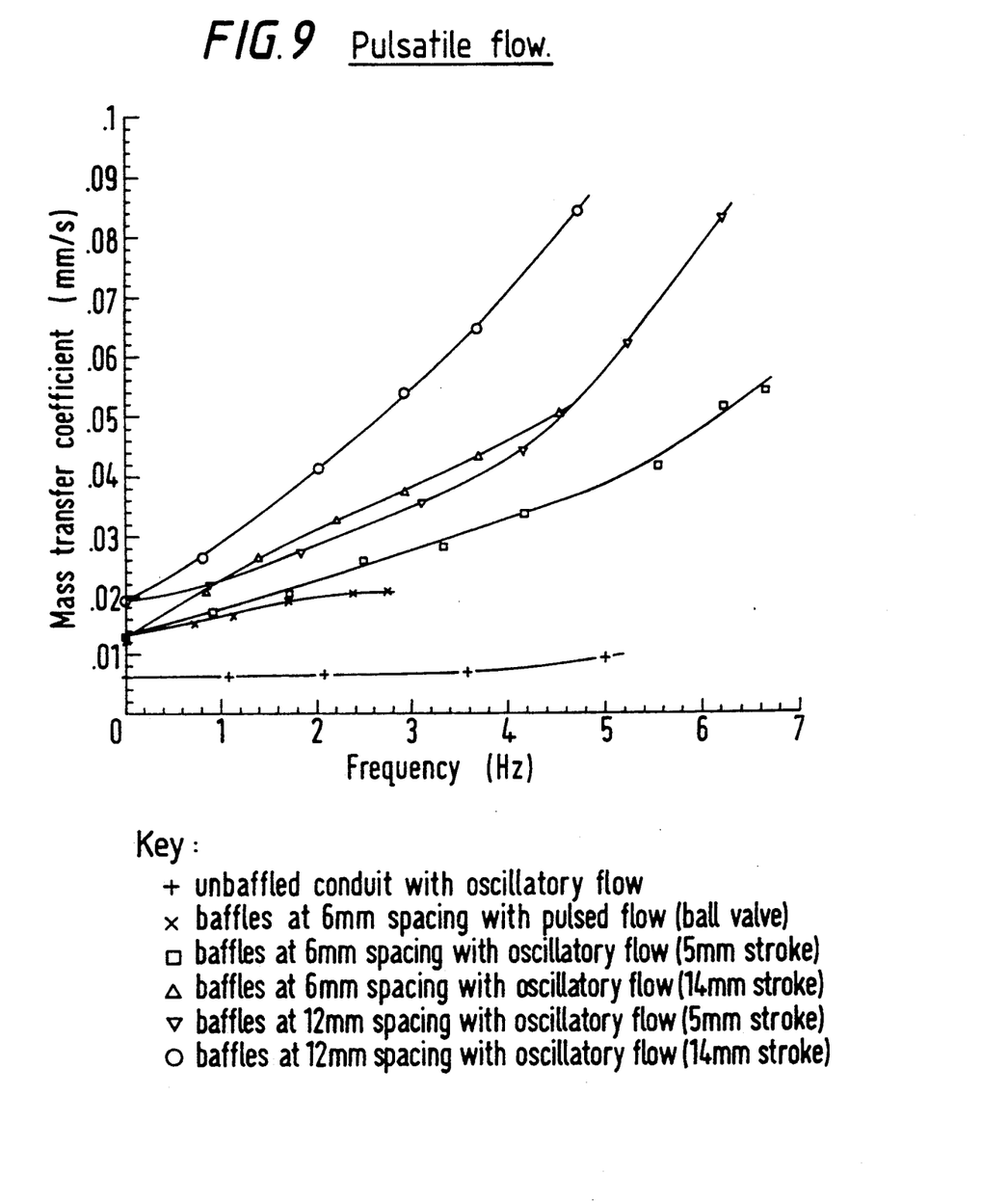
FIG. 9 shows in graph form, the mass transfer coefficients which were measured in baffled and unbaffled conduits with pulsatile fluid flow.

The mass transfer coefficients for an unbaffled 23.6 mm wide conduit with pulsatile flow were measured and are shown in FIG. 9. The mean flow rate was 0.25 l/min which is equivalent to a Reynolds number of 250. Flow oscillation in the unbaffled conduit was by means of the piston pump (10) with a 14 mm pump stroke which was equivalent to 15 mm fluid displacement peak to peak and the instantaneous flow rate was reversed by the oscillations at frequencies of above about 1 Hz. The observed mass transfer coefficients were more or less constant for increasing oscillation frequency with a slight rise at 5 Hz when the pulse amplitude was 1 l/min.

Figure 10:
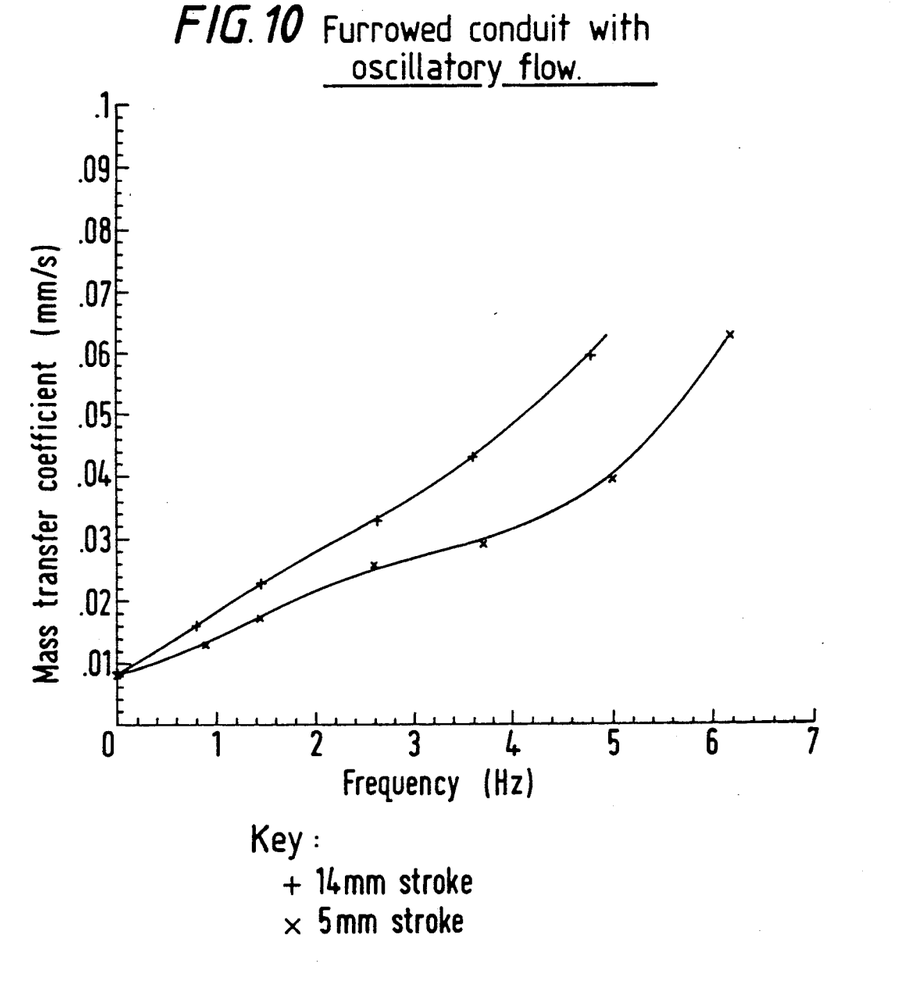
FIG. 10 shows, in graph form, mass transfer coefficients which were measured in a furrowed conduit.

Comparative results for a furrowed 23.6 mm wide conduit as in FIG. 5 are shown in FIG. 10 for a mean flow rate of 0.25 l/min which is equivalent to a Reynolds number of 250 and 14 mm and 5 mm double piston pump strokes, equivalent to 15 mm and 5.3 mm peak to peak fluid displacements in the conduit respectively.

Figure 11:
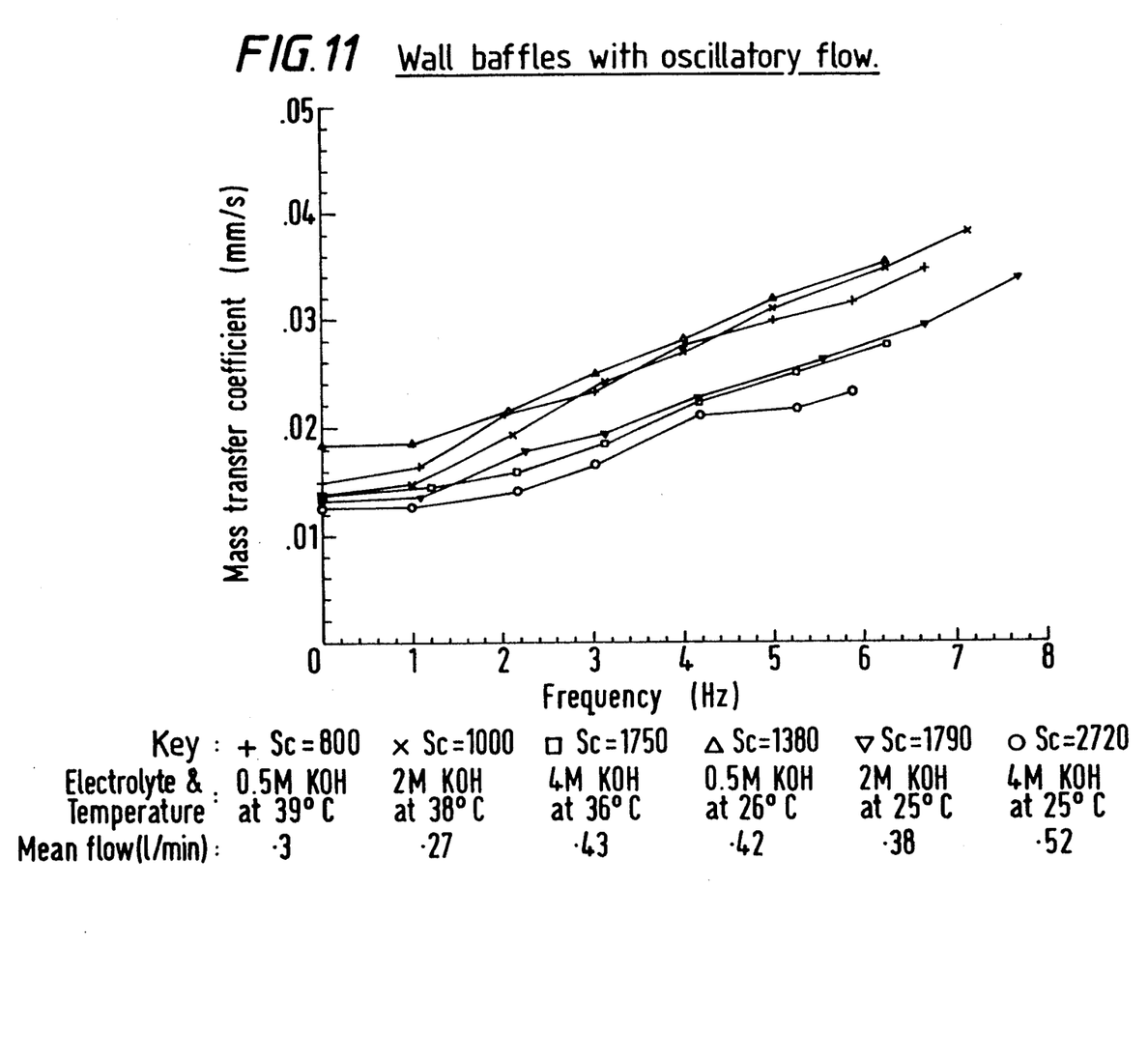
FIG. 11 shows, in graph form, mass transfer coefficients measured for fluids with different Schmidt numbers using a conduit with baffles on the electrode sides of the conduit.

FIG. 11 shows the results obtained for a conduit as in FIGS. 1 and 2 but which was 30 mm wide and 6 mm high and had 1.5 mm high baffles on opposite electrode sides of the conduit as in FIG. 6 at 9 mm spacings. Different molar (M) concentrations of potassium hydroxide (0.5M, 2M, 4M) and different temperatures (25° C. to 40° C.) were used to provide results for fluids at different viscosities and diffusivities and hence at different Schmidt numbers. The Schmidt number (Sc) is defined herein as viscosity/diffusivity. Oscillating fluid flow using a double piston pump at 5 mm pump stroke length was used which is equivalent to a fluid displacement in the conduit of 4.24 mm peak to peak.

Examples According to the Present Invention

The mass transfer coefficients for baffled 23.6 mm wide conduits as in FIG. 4 with pulsatile flow were measured and are shown in FIG. 9. The mean flow rate was 0.25 l/min which is equivalent to Reynolds number of 250. The baffled conduits with pulsatile fluid flow had higher mass transfer coefficients than with steady fluid flow. With pulsed flow which was produced using a ball valve (11) and in which the flow was momentarily stopped and not reversed, there was a 50% increase in mass transfer coefficient at 2.5 Hz with 6 mm spaced baffles. The curve shown in FIG. 9 tended to level off suggesting that there is no further increase with frequency. Measurements made with the baffles as in FIG. 4 at 6 mm and 12 mm spacing are shown in FIG. 9 with oscillating flow using the double piston pump (10) at 5 mm and 14 mm stroke length (equivalent to 5.3 mm and 15 mm peak to peak fluid displacements in the conduit respectively). Flow reversal occurred at frequencies above about 2 Hz at 5 mm stroke length and above about 0.7 Hz at 14 mm stroke length. The maximum mass transfer coefficient measured with the 23.6 mm wide baffled conduit was about 0.08 mm/s which is 16 times that measured in an unbaffled conduit with steady, but similar (0.25 l/min.) mean flow rate.

Figure 12:
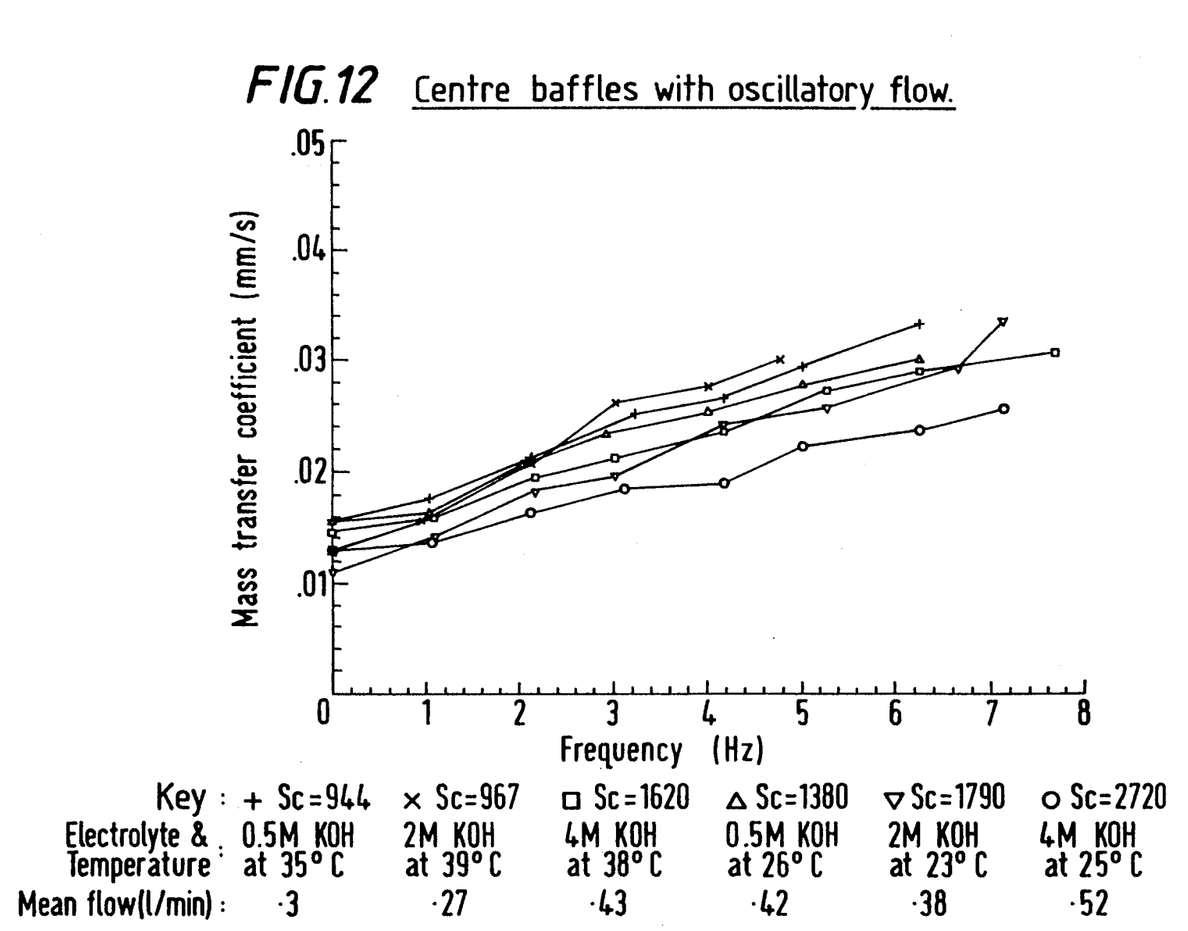
FIG. 12 shows, in graph form, mass transfer coefficients measured for fluids with different Schmidt numbers using a conduit with baffles spaced apart from the electrode sides.

FIG. 12 shows comparable results to FIG. 11 but obtained using 3 mm centered rectangular baffles as in FIG. 4 at 9 mm spacing in place of the two 1.5 mm side baffles on the electrodes. The conduit was 30 mm wide and 6 mm high. Different molar concentrations of potassium hydroxide and different temperatures were used to provide results for fluids at different viscosities and diffusivities and hence at different Schmidt numbers. Oscillating fluid flow from a double piston pump at 5 mm pump stroke was used, which is equivalent to a fluid displacement of 4.24 mm peak to peak. These results show that mass transfer coefficients for baffles spaced from the electrode sides of the conduit are as good as for baffles on the electrode sides of the conduit.

Figure 13:
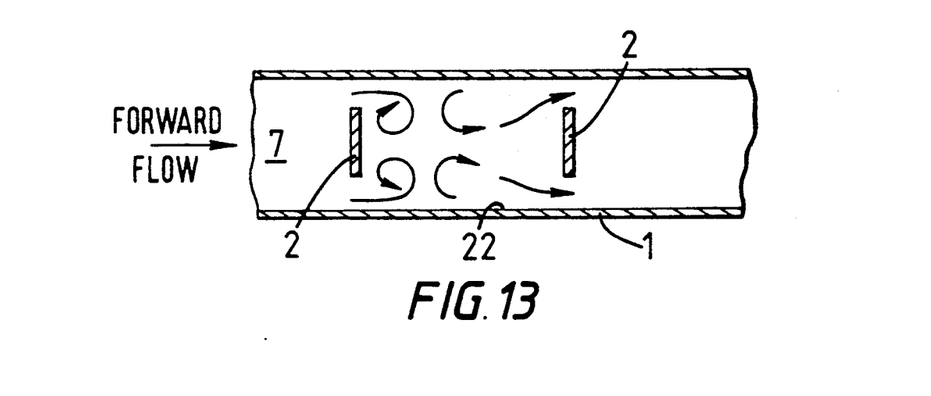
FIGS. 13 and 14 show the flow paths which were observed in the apparatus and method according to the present invention.
Figure 14:
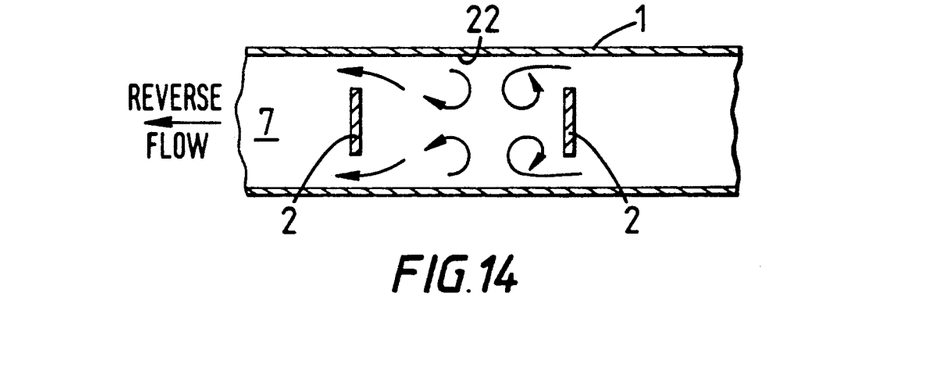

FIGS. 13 and 14 show schematically the flow paths which were observed in an oscillating fluid flow in a conduit (1) with baffles (2) and which were photographed using the apparatus as shown in FIGS. 1 and 2 with dilute aqueous sodium chloride solution (7) at 25° C. with a dispersion of reflective platelets of natural pearl essence called Mearlmaid AA (trade name). The flow paths which were observed during the forward fluid flow are shown in FIG. 13 and during the reverse flow are shown in FIG. 14. From these it will be seen that fluid flow reversal may take place at the transfer surface (22) whereas with baffles attached to the transfer surface, it is believed that fluid flow reversal takes place in the centre of the conduit rather than at the transfer surface. It is believed that this fluid flow reversal at the transfer surface may be particularly beneficial in reducing surface fouling in microfiltration and ultrafiltration processes and the like.

I claim:

1. Apparatus for effecting mass transfer between the bulk of a liquid and a surface boundary layer of said liquid at a transfer surface, said apparatus comprising in combination:
   a conduit having a transverse cross-section and a transfer surface,
   means for passing said liquid in pulsatile flow through the conduit and over said transfer surface, said pulsatile flow being oscillatory so that flow reversal takes place and having an average flow greater than zero through the conduit, and
   at least two baffles transverse to the direction of said fluid flow, the distance between said baffles being between 1 to 4 times the distance between opposite surfaces of said conduit, said baffles being adapted to induce vortex mixing and being spaced apart from said transfer surface.

2. Apparatus according to claim 1 in which said transfer surface comprises a membrane.

3. Apparatus according to claim 1 in which said transfer surface forms at least part of said conduit.

4. Apparatus according to claim 3 in which said conduit has a rectangular transverse cross-section and has a pair of transfer surfaces forming opposite sides of said conduit.

5. Apparatus according to claim 1 in which said conduit and said baffles have circular transverse cross-sections and said baffles are attached to a central shaft along said conduit.

6. Apparatus according to claim 5 in which the distance between said baffles is 1 to 4 times the transverse diameter of said conduit.

7. Apparatus according to claim 1 in which said baffles have sharp edges.

8. Apparatus according to claim 7 in which said baffles have a lateral cross-section selected from the group consisting of rectangular, triangular and diamond-shaped.

9. Apparatus according to claim 1 in which the transverse cross-section area of said baffles is 40 to 60% of the transverse cross-section area of said conduit.

10. Apparatus for effecting heat transfer between the bulk of a liquid and a surface boudary layer of said liquid at a transfer surface, said apparatus comprising in combination:
   a conduit having a transverse cross-section and a transfer surface,
   means for passing said liquid in pulsatile flow through the conduit and over said transfer surface, said pulsatile flow being oscillatory so that flow reversal takes place and having an average flow greater than zero through the conduit, and
   at least two baffles transverse to the direction of said fluid flow, the distance between said baffles being between 1 to 4 times the distance between opposite surfaces of said conduit, said baffles being adapted to induce vortex mixing and being spaced apart from said transfer surface.

11. Filtration apparatus comprising in combination:
   a conduit having a membrane, said membrane having pores of a suitable size to allow liquid to pass through said membrane whilst material is retained within said conduit, means for passing liquid with material in pulsatile flow along said conduit and over said membrane, said pulsatile flow being oscillatory so that flow reversal takes place and having an average flow greater than zero through the conduit, and at least two baffles transverse to the direction of said liquid flow, the distance between said baffles being between 1 to 4 times the distance between opposite surfaces of said conduit, said baffles being adapted to induce vortex mixing and being spaced apart from said membrane.

12. Filtration apparatus, according to claim 11 wherein said material is colloidal.

13. Filtration apparatus, according to claim 11 wherein said material is solute.

14. Filtration apparatus according to claim 11 wherein said material is suspended particulate material.

15. Pervaporation apparatus comprising in combination:
   a conduit having a membrane,
   means for passing a fluid comprising at least two liquids along said conduit and over said membrane in pulsatile flow, said pulsatile flow being oscillatory so that flow reversal takes place and having an average flow of greater than zero through the conduit, said membrane being selectively permeable to at least a part of one of said liquids, and
   at least two baffles transverse to the direction of said fluid flow the distance between said baffles being between 1 to 4 times the distance between opposite surfaces of said conduit, said baffles being adapted to induce vortex mixing and being spaced apart from said membrane.

16. A method of effecting mass transfer between the bulk of a fluid and a surface boundary layer of said fluid at a transfer surface, said method comprising passing said fluid in pulsatile flow along a conduit and over a transfer surface, said pulsatile flow being oscillatory so that flow reversal takes place and having an average flow greater than zero through the conduit, said conduit having baffles transverse to the direction of said fluid flow, the distance between said baffles being between 1 to 4 times the distance between opposite surfaces of said conduit, and said baffles being spaced apart from said transfer surface so that vortex mixing is induced in said fluid.

17. A method of effecting heat transfer between the bulk of a fluid and a surface boundary layer of said fluid at a transfer surface, said method comprising passing said fluid in pulsatile flow along a conduit and over a transfer surface, said pulsatile flow being oscillatory so that flow reversal takes place and having an average flow greater than zero through the conduit, said conduit having baffles transverse to the direction of said fluid flow, the distance between said baffles being between 1 to 4 times the distance between opposite surfaces of said conduit, and said baffles being spaced apart from said transfer surface so that vortex mixing is induced in said fluid.

18. A method of filtration comprising passing liquid with suspended material in pulsatile flow along a conduit and over a membrane having pores of a suitable size so that at least a part of said liquid passed through said membrane whilst said material is retained within said conduit, said pulsatile flow being oscillatory so that flow reversal takes place and having an average flow of greater than zero through said conduit, said conduit having baffles transverse to the direction of said liquid flow, the distance between said baffles being between 1 to 4 times the distance between opposite surfaces of said conduit, and said baffles being spaced apart from said membrane so that vortex mixing is induced in said liquid.

19. A method of filtration, according to claim 18 wherein said material is colloidal.

20. A method of filtration, according to claim 18 wherein said material is solute.

21. A method of filtration according to claim 18 wherein said material is suspended particulate material.

22. A method of pervaporation comprising passing a fluid comprising at least two liquids in pulsatile flow along a conduit and over a membrane which selectively allows at least a part of one of said liquids to pass through said membrane, said pulsatile flow being oscillatory so that flow reversal takes place and having an average flow greater than zero through the conduit, said conduit having baffles transverse to the direction of said fluid flow, the distance between said baffles being between 1 to 4 times the distance between opposite surfaces of said conduit, and said baffles being spaced apart from said membrane so that vortex mixing is induced in said fluid.

* * * * *